United States Patent
Gallagher

[11] Patent Number: 6,139,049
[45] Date of Patent: Oct. 31, 2000

[54] AIR BAG TEAR SEAM AND METHOD OF MANUFACTURE

[75] Inventor: Michael J. Gallagher, Manchester, N.H.

[73] Assignee: Textron Automotive Company Inc., Troy, Mich.

[21] Appl. No.: 09/482,133

[22] Filed: Jan. 12, 2000

Related U.S. Application Data

[62] Division of application No. 09/051,834, filed as application No. PCT/US96/17947, Nov. 8, 1996, Pat. No. 6,062,590.
[60] Provisional application No. 60/006,404, Nov. 9, 1995.

[51] Int. Cl.[7] .................................................. B60R 21/20
[52] U.S. Cl. ................ 280/728.3; 280/732; 219/121.69; 219/121.71; 219/121.85
[58] Field of Search .............................. 280/728.1, 728.3, 280/730.2, 732; 219/121.69, 121.71, 121.85; 264/446, 494

[56] References Cited

U.S. PATENT DOCUMENTS

| | | | |
|---|---|---|---|
| 5,358,986 | 10/1994 | Onofusa et al. | 524/284 |
| 5,744,776 | 4/1998 | Bauer | 219/121.7 |
| 5,776,566 | 7/1998 | Mace et al. | 428/34.5 |
| 5,882,572 | 3/1999 | Lutze et al. | 264/400 |
| 5,883,356 | 3/1999 | Bauer et al. | 219/121.62 |
| 5,961,143 | 10/1999 | Hlywka et al. | 280/728.3 |

*Primary Examiner*—Eric Culbreth
*Assistant Examiner*—L. Lum
*Attorney, Agent, or Firm*—Reising, Ethington, Barnes, Kisselle, Learman & McCulloch, P.C.

[57] ABSTRACT

A method for manufacture an air bag cover includes providing a cover skin made of a polymeric material and weakening a seam region in the skin by selective exposure to ultraviolet light.

13 Claims, 1 Drawing Sheet

AIR BAG TEAR SEAM AND METHOD OF MANUFACTURE

This is a division of application Ser. No. 09/051,834, filed on Sep. 21, 1998 now U.S. Pat. No. 6,067,590 which is a 371 of PCT/US96/17947 filed Nov. 8, 1996.

This application claims benefit of Provisional application Ser. No. 60/006,404 filed Nov. 9, 1995.

TECHNICAL FIELD

This invention relates generally to automotive air bag door tear seams and, more particularly, to chemically weakened tear seams.

BACKGROUND OF THE INVENTION

Tear seams for air bag door covers are currently produced by a number of different methods. One technique is to mold a thinned section into the cover during its manufacture. This method provides a designed-in, relatively weaker tear seam region along which the cover separates in response to air bag deployment. However, molded-in tear seams of this type have a tendency, over time, to show-through as a visible depression on the outer class A surface of the cover. Vehicle occupants can, therefore, see the pattern of the tear seam in the outer surface of the cover.

The tear seam may also be produced after molding the air bag cover skin, i.e., in a "post-molding operation", by scoring the skin with a knife, hot tool, laser, or other instrument to produce a thinned section in the pattern of a tear seam. However, such post molding operations are costly and must be carefully controlled.

Still another way to produce a weakened tear seam is to form the tear seam region from a weaker material than the rest of the air bag cover skin is formed from. Methods of this type are disclosed in U.S. Pat. Nos. 5,530,057 and 5,567,375, both assigned to the assignee of the present invention. Each of these patents disclose a casting process for forming an integral tear seam from plastic powder. Unlike the plastic powder used to form the rest of the cover skin, the plastic powder cast to form the tear seam region includes a "filler" material such as glass or carbonate. The resulting mixture has significantly less tensile strength than the plastic powder cast to form the rest of the cover skin. However, this method adds steps and cost to the manufacturing process.

It is desirable, when constructing an air bag door cover, to use a cover skin material that can withstand the harmful effects of extended exposure to solar radiation in the ultraviolet portion of the electromagnetic spectrum. Polymeric materials commonly used in forming air bag cover skins are subject to a phenomenon known as photodegradation caused by exposure to UV radiation and oxygen. Photodegradation comprises two distinct chemical processes that together result in chain scission and/or crosslinking in polymer molecules, i.e., the breakage of polymer bonds. In the first of the two processes, photolysis, a polymer absorbs UV radiation which breaks molecular bonds within the polymer forming free radicals. In the second process, autoxidation, the free radicals interact with oxygen to form peroxy radicals.

When polymeric materials are "weathered" in this manner, a strong change in morphology results which affects the mechanical behavior of the polymer. For example, the density and crystallinity of the polymer typically increase while its molecular weight and surface roughness decrease. This results in polymer embrittlement which correspondingly reduces the tensile strength and/or the percent elongation measured "at the break," i.e. at the point when the material breaks under a tensile load.

Photodegradation can be controlled or eliminated by including UV stabilizers or "inhibitors" which prevent these chemical reactions from occurring. UV promoters are also available that can actually accelerate these chemical reactions. Both UV inhibitors and promoters may be formulated to act only within a desired wavelength range.

UV inhibitors are generally formulated to inhibit UV light in the wavelength range from 320 to 390 nanometers—the so-called "UV-A" range where the ozone layer absorbs very little solar UV radiation. UV inhibitors may also be formulated to cover the wavelength range from 280 to 320 nanometers—the "UV-B" range where most, but not all solar UV radiation is absorbed in the ozone layer. Within the wavelength range from 150 to 280 nanometers, i.e., the "UV-C" range, the ozone layer absorbs practically all solar UV radiation with peak ozone absorption occurring at approximately the 250 nanometer wavelength.

What is needed is a simple, cost effective means of producing an air bag cover having tear seam that is both cost effective to produce and visually undetectable on the outer class A surface of an air bag cover skin.

SUMMARY OF THE INVENTION

In accordance with this invention, an air bag cover is produced that includes an air bag cover skin made from plastics material susceptible to photodegradation. At least one side of the cover skin is then exposed, under controlled conditions, to light radiated from a light generator. The exposure to light degrades and weakens the cover skin in a selected tear seam region corresponding to the tear seam to be produced. The rest of the cover skin, i.e., the non-tear seam region, is shielded or masked from the light. A tear seam produced in this manner is visibly undetectable to the occupants of the vehicle and less costly to produce.

According to one aspect of the present invention the air bag cover skin includes a compound formulated to promote photodegradation of the cover skin polymeric material. These compounds, known as "UV promoters", increase the rate of photodegradation in the tear seam region which reduces the time and the amount of energy required to effectively photodegrade the polymeric material of the tear seam region of the cover skin.

According to another aspect of the present invention the polymeric material of the air bag cover skin includes UV inhibitors formulated to inhibit UV radiation having wavelengths greater than 320 nanometers. The UV inhibitors protect the cover skin from long-term photodegradation due to solar UV radiation. The UV inhibitors may be formulated to inhibit only UV radiation having wavelengths greater than 280 nanometers.

According to another aspect of the present invention a method is provided for manufacturing the air bag cover skin described above. The air bag cover skin is first formed from a polymeric material. The non-tear seam region of the air bag cover skin is then masked-off and illuminated with electromagnetic radiation of sufficient intensity and within a range of wavelengths that will weaken the polymeric material of the air bag cover skin. The air bag cover skin is illuminated in this manner until the electromagnetic radiation has weakened the polymeric material of the unmasked tear seam region.

According to another aspect of the present invention, the non-tear seam region is masked by placing a template over the air bag cover skin surface to be irradiated. The template includes an opening having a pattern corresponding in size and shape to the tear seam pattern.

According to another aspect of the present invention, the masking template is included in a single apparatus with the light generator. The template portion of this template-lamp apparatus is then placed directly on the air bag cover skin surface to be irradiated.

According to another aspect of the present invention, the light generator produces no light in the infrared spectrum. This reduces the amount of heat energy imparted to the cover skin and allows the light generator to be placed much closer to the irradiated surface of the air bag cover skin without softening and deforming the skin. The light may be further restricted to include only ultraviolet light to achieve a greater amount of degradation for the amount of energy used.

According to another aspect of the present invention, the cover skin is illumined within an illumination range including only a portion of the ultraviolet spectrum. In addition, UV inhibitors are included in the polymeric cover skin material and are specifically formulated to inhibit UV radiation outside the illumination range. This allows the UV inhibitors to prevent long-term solar UV photodegradation without inhibiting intentional photodegradation in the illumination range. The illumination wavelength range may be restricted to less than 320 nanometers where most solar UV radiation is absorbed in the ozone layer or may be further limited to less than 280 nanometers where the ozone layer absorbs almost all UV radiation. Correspondingly, UV inhibitors may be formulated to inhibit UV radiation greater than 320 nm and 280 nm, respectively.

Those in the plastics industry normally consider photodegradation to be detrimental to the properties of polymers. This is because photodegradation causes polymer bonds to break which chemically weakens the material. The usual practice is to combat photodegradation by adding ultraviolet (UV) stabilizers, i.e., UV inhibitors, to the material. UV inhibitors lessen, or altogether eliminate, the damaging effects of UV radiation. This invention, to the contrary, recognizes photodegradation as an attribute and uses it, under controlled conditions, to produce the tear seam in the polymer air bag cover skin.

BRIEF DESCRIPTION OF THE DRAWINGS

To better understand and appreciate the invention, refer to the following detailed description in connection with the accompanying drawings in which.

DETAILED DESCRIPTION OF THE PREFERRED EMBODIMENT

Figure 1:
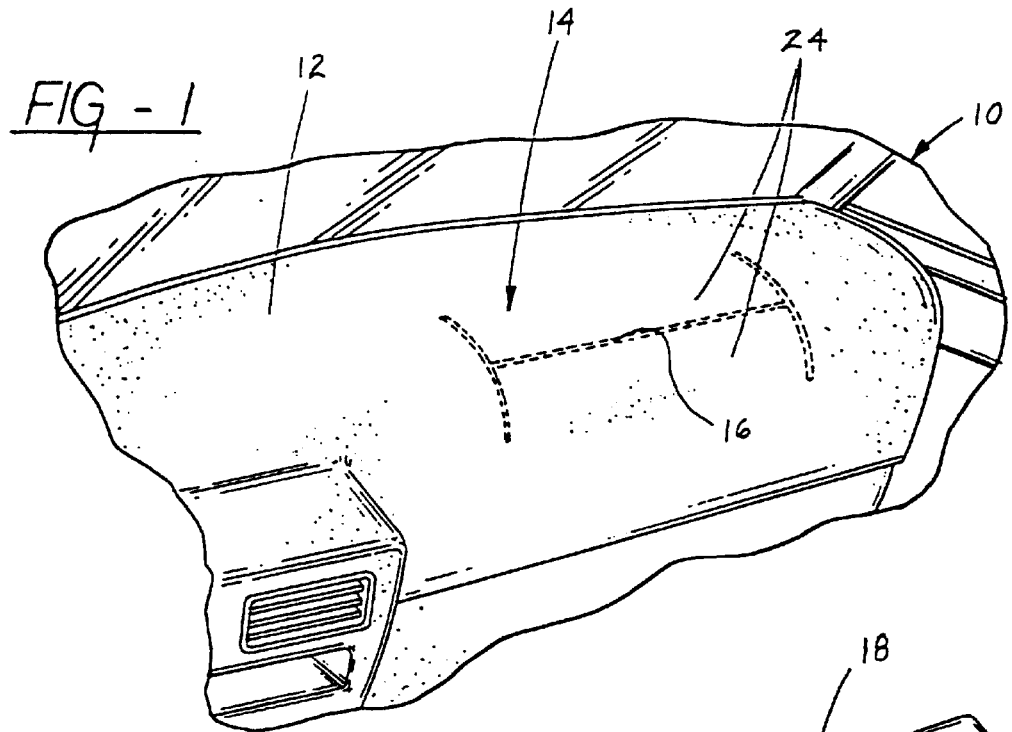
FIG. 1 is a perspective view of a vehicle dash board having an air bag door cover portion concealing a passenger side supplemental inflatable restraint (SIR) air bag system.

Turning now to a more detailed description of the invention, FIG. 1 illustrates the interior 10 of an automobile having an instrument panel or dash board 12 of known construction. The dash board 12 is provided with an air bag cover skin portion 14 formed with a weakened tear seam 16. The tear seam 16 overlies and conceals a supplemental inflatable restraint (SIR) air bag system (not shown) that is mounted beneath the instrument panel 12 and which is operative in a known manner to deploy into the interior compartment 10 of the vehicle through an air bag escape breach formed through the air bag cover skin 14 when the tear seam 16 tears.

The invention is also applicable to driver side-type air bag applications (not shown) in which an inflatable air bag is housed within the steering wheel assembly of the vehicle and concealed by similar cover material having a designed-in tear seam for deploying an air bag and made according to the same photodegradation process. The invention is also applicable to cover skin materials for both "soft" products and "hard" products. In soft products the cover skin material is a separate layer from any underlying support structure. In hard products the cover skin material and any underlying support structure are one and the same, i.e., they are formed together as a single unitary piece.

The cover 14 is fabricated from a suitable polymeric plastics material according to conventional forming techniques known to the art, such as slush molding. Like all polymers, the material used for the cover 14 is susceptible to chemical photodegradation when exposed to ultraviolet light radiation.

Figure 2:
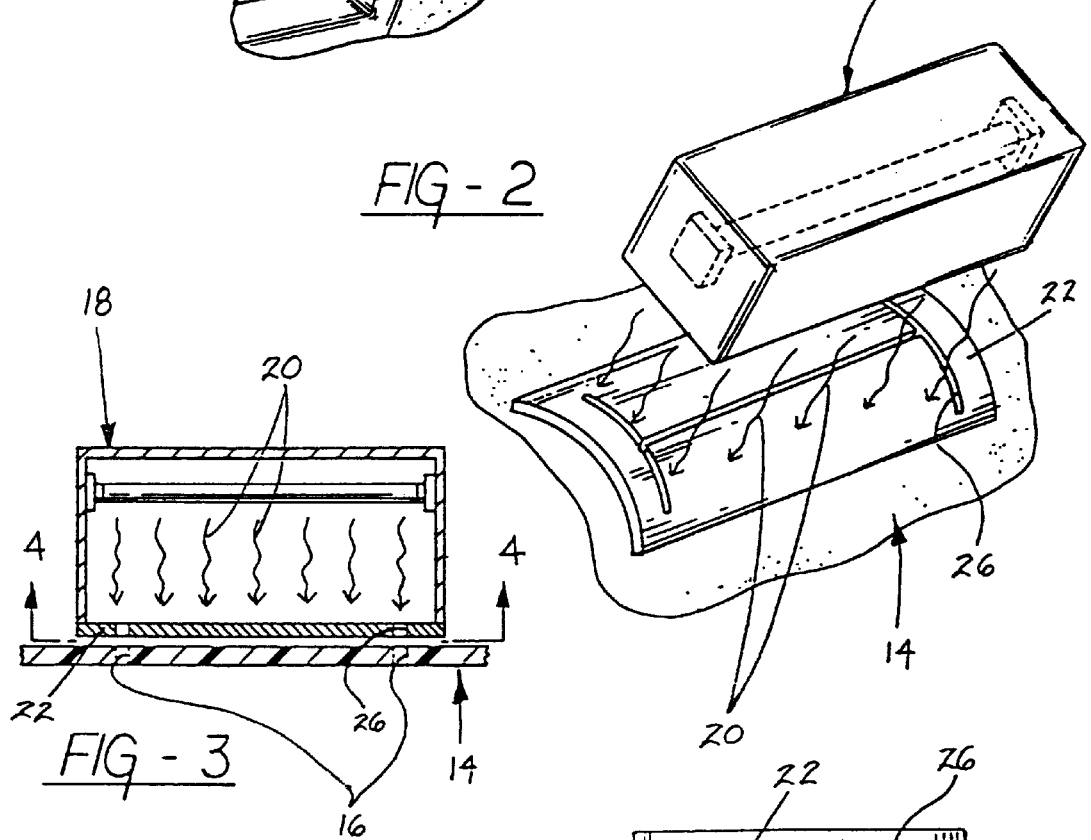
FIG. 2 is a diagrammatic view showing one method of preparing a tear seam according to the present invention.

Broadly, the invention involves radiating the air bag cover skin 14 in the area that is to function as the tear seam, i.e., the tear seam region 16, from either the front or back surface of the air bag cover skin 14 sufficiently to locally weaken the material and produce a visibly undetectable tear seam 16. FIG. 2 illustrates one method of generating the tear seam 16 according to this invention. A UV radiation device, or "UV generator" 18, is arranged over the one surface of the air bag cover skin 14 and energized to direct UV radiation 20 onto the facing surface of the cover 14. A UV blocking template 22 is arranged between the UV generator 18 and the cover material 14 to block the transmission of the UV radiation 20 to a non-tear seam region 24 of the air bag cover skin 14 except through prescribed openings 26 in the template 22. The openings 26 correspond in size and shape to the tear seam 16 to be produced, i.e., the tear seam region 16 of the air bag cover skin 14. As illustrated, the template openings 26 and tear seam region 16 have a corresponding H-shape, but this is just one pattern of may different patterns that can be employed. Other patterns contemplated include, but are not limited to, "X" and "C"-shaped tear seam patterns. The template 22 may comprise a panel made of metal, wood, or other material that would serve to block UV radiation transmission to the underlying non-tear seam region 24 of the air bag cover skin 14 while allowing UV radiation transmission through the template opening 26 to the air bag cover skin tear seam region 16.

The photodegradation of the exposed polymeric material 14 can be controlled by controlling the UV exposure time. The time required to achieve a certain degree of material degradation may vary from one cover to another and may depend on such factors as the type of material used for the cover, its thickness, the ambient temperature, the intensity of the UV light, and the irradiance and wave length of the light. The UV light employed preferably has a wave length in the approximate range of 10–340 nm to provide optimum energy. It is also preferable that the UV light generator does not emit UV light outside this preferred range. More preferably, the UV generator 18 emits no electromagnetic radiation in the infrared portion of the electromagnetic spectrum, i.e., 0.002 cm–0.02 cm, to minimize or eliminate thermal heat generation associated with infrared radiation. This enables the UV generator 18 to be placed closer to the cover 14 during treatment to achieve photodegradation without also causing thermal softening and/or cover deformation.

Figure 3:
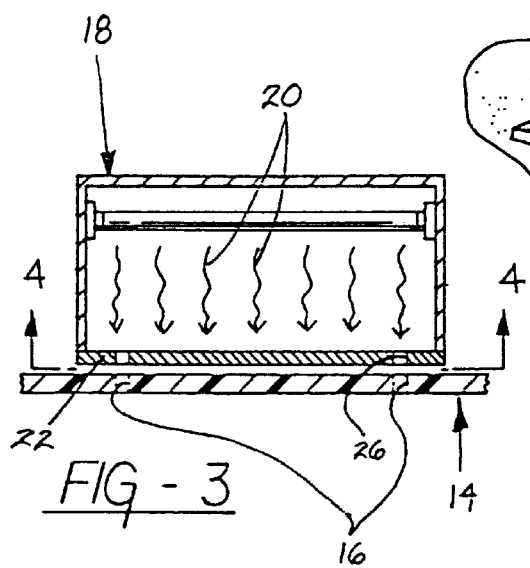
FIG. 3 is a diagrammatic view showing an alternative method of preparing the tear seam according to the invention.
Figure 4:
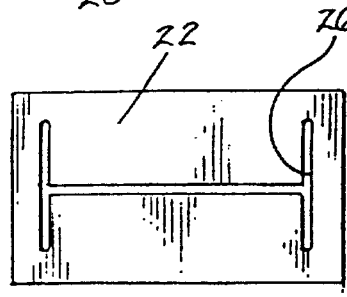
FIG. 4 is a view taken along lines 4—4 of FIG. 3.

FIGS. 3 and 4 illustrate a variation of the UV emitting apparatus of FIG. 2 in which the UV blocking template 22 is attached as a bottom panel of a UV generating unit 18 as opposed to being a separate independent piece as shown in FIG. 2. The remaining features and operation, however, are the same as those described above in connection with FIG. 2.

In addition to controlling the UV generator 18, the cover material itself may, through appropriate selection of UV inhibitors and promoters, be formulated to control the susceptibility of the material to photodegradation in the prescribed wave length ranges mentioned above. This is achieved by including appropriate UV inhibitors and/or promoters in the polymeric material of the air bag cover skin 14.

More specifically, a UV generator that emits in only a portion of the UV spectrum may be used to illuminate cover material that includes UV inhibitors formulated to inhibit UV radiation 20 outside that portion of the spectrum. Various formulations of UV inhibitors are commercially available from Ciba-Geigy Corp., Ciba Additives, 7 Skyline Dr., Hawthorne N.Y. 1053-2188.

As an alternative to the use of inhibitors, or in addition to their use, UV promoters may be included in the cover material that enhance the degrading effects of UV light in that portion of the spectrum. UV promoters preferably comprise compounds with double bonds because such bonds are inherently more unstable than single bonds. Because double bonds are more unstable, compounds with double bonds are more susceptible to breakage when exposed to UV radiation. Examples of suitable compounds with double bonds include most natural and synthetic rubbers. Suitable promoters could be non-chemically bonded to a base cover skin material or may be chemically bonded with the base cover skin material, i.e., bonded directly to the "backbones" of the polymer molecules that make up the base cover skin material. Polymers preferred for use as base cover skin materials include vinyl, olefin, olefin elastomers, polycarbonate, acrylonitrile-butadine-styrene (ABS), acrylonitrile-styrene-acrylic, polyester and urethanes.

Illumination wavelengths may also be coordinated with appropriate UV promoters and inhibitors to employ intentional tear seam photodegradation while preventing long-term solar UV degradation of the cover skin 14 as a whole. According to one embodiment of the present invention, the illumination range of the UV generator 18 is restricted to ultraviolet light having wavelengths less than 320 nanometers, i.e., light in the UV-B and UV-C ranges where the ozone layer absorbs most solar UV radiation. The cover material to be illuminated in these ranges includes UV promoters formulated to promote the degrading effects of electromagnetic radiation having wavelengths less than 320 nanometers. The cover material may also include inhibitors formulated to inhibit radiation having wavelengths greater than 320 nanometers, i.e. radiation in the UV-A range. The UV-B and C promoters help to intentionally photodegrade the tear seam region 16 while the UV-A inhibitors prevent long-term cover skin degradation due to solar UV radiation. The UV generator illumination range is restricted to UV-B and UV-C to avoid wasting the energy that would be necessary to produce radiation in the inhibited UV-A region of the ultraviolet spectrum.

According to another embodiment of the present invention, the UV generator illumination range is further restricted to ultraviolet light having wavelengths less than 280 nanometers, i.e., light in the UV-C range where the ozone layer absorbs the most electromagnetic energy. The cover material to be illuminated by the UV-C radiation includes UV-C promoters formulated to promote the degrading effects of electromagnetic radiation having wavelengths less than 280 nanometers. The cover material may also include inhibitors formulated to inhibit radiation having wavelengths greater than 280 nanometers, i.e. radiation in the UV-A and UV-B ranges. The UV-C promoters help to intentionally photodegrade the tear seam region 16 while the UV-A and B inhibitors prevent long-term cover skin degradation due to solar UV radiation. The UV generator illumination range is restricted to UV-C to avoid wasting the energy that would be necessary to produce radiation in the inhibited UV-A and UV-B regions of the ultraviolet spectrum.

Accordingly, the invention contemplates a method of producing a tear seam 16 in an SIR air bag cover skin 14 prepared from photodegradable plastics material in which a preselected tear seam region 16 of the cover material is weakened by photodegradation. The preferred method for producing such a tear seam 16 is to shield the non-tear seam region 24 of the air bag cover skin material with a UV-blocking template 22. The template 22 used in this process has an opening 26 having a size and shape which corresponds to the size and shape of the tear seam 16. The cover is irradiated with UV light to photodegrade the exposed tear seam region 16 of the air bag cover skin material. The irradiation causes polymer chains in the tear seam region 16 to break and crosslink to a greater extent than those of the air bag cover skin material making up the surrounding non-tear seam region 24. As a result, the polymeric material of the tear seam region 16 is relatively more brittle and weaker than the surrounding polymeric material of the non-tear seam region 24. However, there is no visually discernable difference between the tear seam region 16 and non-tear seam region 24. In other words, the outer surface, i.e., the outer class A surface, of the air bag cover skin 14 provides no visible evidence that a tear seam 16 exists.

Other embodiments of the invention which accomplish the same function and/or achieve the same result are incorporated herein within the scope of any ultimately allowed patent claims.

The above is an illustrative description of the invention using words of description rather than of limitation. Obviously, many modifications and variations of this invention are possible in light of the above teachings. Within the scope of the claims one may practice the invention other than as described.

What is claimed is:

1. A method for manufacturing an air bag cover skin for an air bag cover, the air bag cover skin comprising a polymeric material and including an inner and an outer surface, a tear seam region, a non-tear seam region surrounding the tear seam region, the polymeric material of the tear seam region being photodegraded to a greater extent than the polymeric material of the non-tear seam region, said method comprising the steps of:

forming the air bag cover skin from a polymeric material;

masking the non-tear seam region of the air bag cover skin with a substance generally opaque to wavelengths of electromagnetic radiation that are capable of weakening the polymeric material of the air bag cover skin;

illuminating at least one the inner and outer air bag cover skin surfaces with electromagnetic radiation of sufficient intensity and within a range of wavelengths that will weaken the polymeric material of the air bag cover skin; and continuing to illuminate the air bag cover skin until the electromagnetic radiation has weakened the polymeric material of the unmasked tear seam region.

2. A method for manufacturing an air bag cover as set forth in claim 1 in which said step of masking includes the step of placing a template over the air bag cover skin surface to be irradiated.

3. A method for manufacturing an air bag cover as set forth in claim 1 in which said step of masking includes the step of placing a combination masking template and light generator apparatus over the air bag cover skin surface to be irradiated.

4. A method for manufacturing an air bag cover as set forth in claim 1 in which said step of illuminating includes illumination limited to radiation outside an infrared portion of an electromagnetic spectrum.

5. A method for manufacturing an air bag cover as set forth in claim 1 in which said step of illuminating includes illumination with electromagnetic radiation in an ultraviolet portion of the electromagnetic spectrum.

6. A method for manufacturing an air bag cover as set forth in claim 5 in which said step of illuminating includes illumination within an illumination range generally restricted to include only a portion of the ultraviolet portion of the electromagnetic spectrum and in which said step of forming the air bag cover skin includes the step of including UV inhibitors in the polymeric material formulated to inhibit cover skin photodegradation caused by UV radiation having wavelengths outside the illumination range of wavelengths.

7. A method for manufacturing an air bag cover as set forth in claim 5 in which said step of illuminating includes an illumination range restricted to ultraviolet light having wavelengths less than 320 nanometers.

8. A method for manufacturing an air bag cover as set forth in claim 5 in which said step of illuminating includes the step of illuminating in an illumination range restricted to ultraviolet light having wavelengths less than 280 nanometers.

9. A method for manufacturing an air bag cover as set forth in claim 6 in which said step of forming the air bag cover skin includes the step of including a compound in the polymeric material which promotes cover skin photodegradation caused by UV radiation having wavelengths within the illumination range of wavelengths.

10. A method for manufacturing an air bag cover as set forth in claim 7 in which said step of forming the air bag cover skin includes the step of including a compound in the polymeric material which promotes cover skin photodegradation caused by UV radiation having wavelengths less than 320 nanometers.

11. A method for manufacturing an air bag cover as set forth in claim 7 in which said step of forming the air bag cover skin includes the step of including UV inhibitors in the polymeric material formulated to inhibit cover skin photodegradation caused by UV radiation having wavelengths greater than 320 nanometers.

12. A method for manufacturing an air bag cover as set forth in claim 8 in which said step of forming the air bag cover skin includes the step of including a compound in the polymeric material which promotes cover skin photodegradation caused by UV radiation having wavelengths less than 280 nanometers.

13. A method for manufacturing an air bag cover as set forth in claim 8 in which said step of forming the air bag cover skin includes the step of including UV inhibitors in the polymeric material formulated to inhibit cover skin photodegradation caused by UV radiation having wavelengths greater than 280 nanometers.

* * * * *